United States Patent [19]
Sudo

[11] Patent Number: 5,889,509
[45] Date of Patent: Mar. 30, 1999

[54] COMMUNICATIONS TERMINAL APPARATUS AND DISPLAY METHOD THEREOF

[75] Inventor: Fukuharu Sudo, Tokyo, Japan

[73] Assignee: Sony Corporation, Tokyo, Japan

[21] Appl. No.: 661,643

[22] Filed: Jun. 11, 1996

[30] Foreign Application Priority Data

Jun. 16, 1995 [JP] Japan .................................... 7-174266

[51] Int. Cl.⁶ .................................................. G09G 5/00
[52] U.S. Cl. ........................ 345/168; 345/961; 345/978; 455/403
[58] Field of Search ............................ 340/945; 345/168, 345/333, 334, 978, 961; 455/127, 343, 572, 566, 403; 364/709.16

[56] References Cited

U.S. PATENT DOCUMENTS

| | | | |
|---|---|---|---|
| 5,212,811 | 5/1993 | Kuge et al. ............................. | 455/127 |
| 5,243,339 | 9/1993 | Graham et al. ........................ | 340/945 |
| 5,633,912 | 5/1997 | Tsoi ....................................... | 455/566 |
| 5,636,265 | 6/1997 | O'Connell et al. .................... | 455/127 |
| 5,680,535 | 10/1997 | Harbin et al. .......................... | 345/473 |

*Primary Examiner*—Brent A. Swarthout
*Attorney, Agent, or Firm*—Jay H. Maioli

[57] ABSTRACT

A communications terminal apparatus and display method thereof to make the user aware of the operational state of a portable telephone thus preventing the malfunctions of and damages caused by the user. In the present invention, when a manipulation key is continuously depressed for a predetermined duration or more, the apparatus is set into an operating state corresponding to the manipulation key, after images sequentially changing in accordance with the lapse of depressing time of the manipulation key are displayed on a display with corresponding sound effects. When the manipulation key is not continuously depressed for the predetermined duration or more, the apparatus is returned to the operating state prior to the depression of the manipulation key, after the images and corresponding sound effects having changed in accordance with the depressing time of the manipulation key are displayed on the display on the reverse order. Thereby, a communications terminal apparatus and display method thereof which make the user aware of a manipulated state of the manipulation key thus preventing malfunctions can be realized.

10 Claims, 3 Drawing Sheets

FIG. 2A 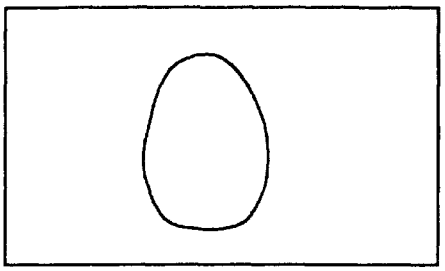 FROM DEPRESSION
OF POWER KEY
0~0.2 SECONDS (ON)
0.8~1.0 SECONDS (OFF)

FIG. 2B 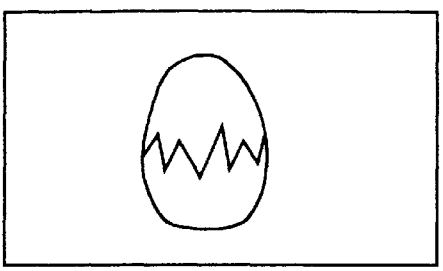 FROM DEPRESSION
OF POWER KEY
0.2~0.4 SECONDS (ON)
0.6~0.8 SECONDS (OFF)
EFFECT SOUND "PARITZ"

FIG. 2C 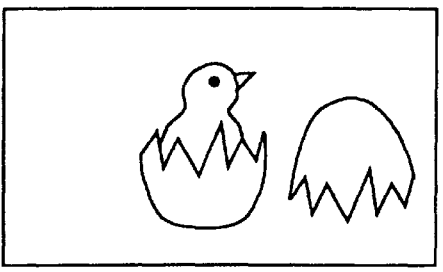 FROM DEPRESSION
OF POWER KEY
0.4~0.6 SECONDS (ON)
0.4~0.6 SECONDS (OFF)
EFFECT SOUND "PEEP"

FIG. 2D 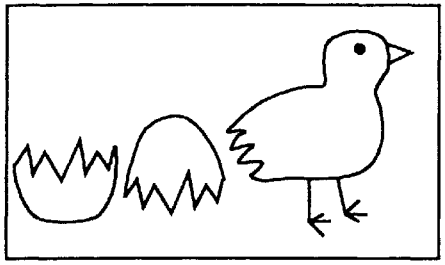 FROM DEPRESSION
OF POWER KEY
0.6~0.8 SECONDS (ON)
0.2~0.4 SECONDS (OFF)
EFFECT SOUND "PEEP,PEEP"

FIG. 2E 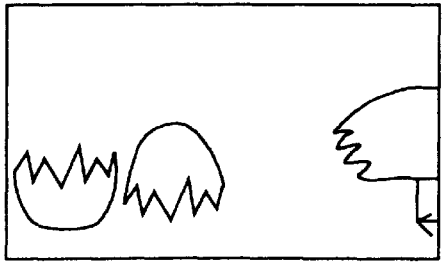 FROM DEPRESSION
OF POWER KEY
0.8~1.0 SECONDS (ON)
0~0.2 SECONDS (OFF)
EFFECT SOUND
    "PEEP,PEEP,PEEP"

COMMUNICATIONS TERMINAL APPARATUS AND DISPLAY METHOD THEREOF

BACKGROUND OF THE INVENTION

1. Field of the Invention

This invention relates to a communications terminal apparatus and display method thereof, and is applicable to portable telephones.

2. Description of the Related Art

In recent years, portable telephones have been manufactured to increasingly reduce their size and weight. For this purpose, some portable telephones are provided with manipulation keys flush with the surface of a manipulation panel, manipulation keys arranged on a plane lower than a manipulation panel, or the like. Some of these keys (for example, a power key) are designed such that they do not respond unless they are continuously depressed for a certain duration, in order to prevent inadvertent manipulations thereon.

However, with a portable telephone having manipulation keys as mentioned above, since a manipulation key must be continuously depressed for operation, a user may continuously depress the manipulation key with rather excessive force for more than a necessary duration, thereby resulting in damaging the manipulation key.

In addition, the portable telephone of the type mentioned above has the problem that it may or may not operate as deseired. For example, although the user, after depressing a power key, assumes that the telephone is powered on, the telephone may not be actually powered on since the user did not continuously depress the power key for a necessary duration or longer. Conversely, although the user assumes that the portable telephone is powered off, it is not actually powered off since the user did not continuously depress the power key for the necessary period of time or longer.

SUMMARY OF THE INVENTION

In view of the foregoing, an object of this invention is to provide a communications terminal apparatus and display method which make the user aware of an operation state of the apparatus and can prevent malfunctions and damages of the apparatus possibly caused by inadvertent manipulations by the user.

The foregoing object and other objects of the invention have been achieved by the provision of a communications terminal apparatus and display method thereof in which, when a manipulation key is continuously depressed for a predetermined duration or longer, the control circuitry sets a communications terminal apparatus into an operating state corresponding to the manipulation key, after sequentially displaying the images changing in accordance with the lapse of a depressing time on the display means and sequentially generating the effect sound from the confirmation circuitry. When the manipulation key is not continuously depressed for the predetermined duration, the control circuitry returns the communications terminal apparatus to an operating state prior to the depression of the manipulation key, after displaying the images having changed in accordance with the depressing time of the manipulation key on the reverse order on the display means and generating the effect sound which has changed in accordance with the images.

When the manipulation key is continuously depressed for the predetermined duration or more, the communications terminal apparatus is set into the operating state corresponding to the manipulation key, after the images sequentially changing in accordance with the lapse of a depressing time are sequentially displayed on the display means and effect sound changing in accordance with the images is generated. Conversely, when the manipulation key is not continuously depressed for the predetermined duration or more, the communications terminal apparatus is returned to the operating state prior to the depression of the manipulation key, after the images having changed in accordance with a depressing time of the manipulation key are displayed on the display circuitry on the reverse order and the effect sound having changed in accordance with the images is generated from the confirmation circuitry together with the images. In this way, the user is made aware of an operating state of the manipulation key, thereby making it possible to prevent damages to the manipulation key and malfunctions of the communications terminal apparatus caused by inadvertent manipulations by the user.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 2A to 2E are schematic diagrams showing the relationship between a power key depressing period and images displayed on the LCD according to an embodiment of the present invention.

DETAILED DESCRIPTION OF THE EMBODIMENT

Preferred embodiment of this invention will be described with reference to the accompanying drawings:

(1) General Configuration

Figure 1:
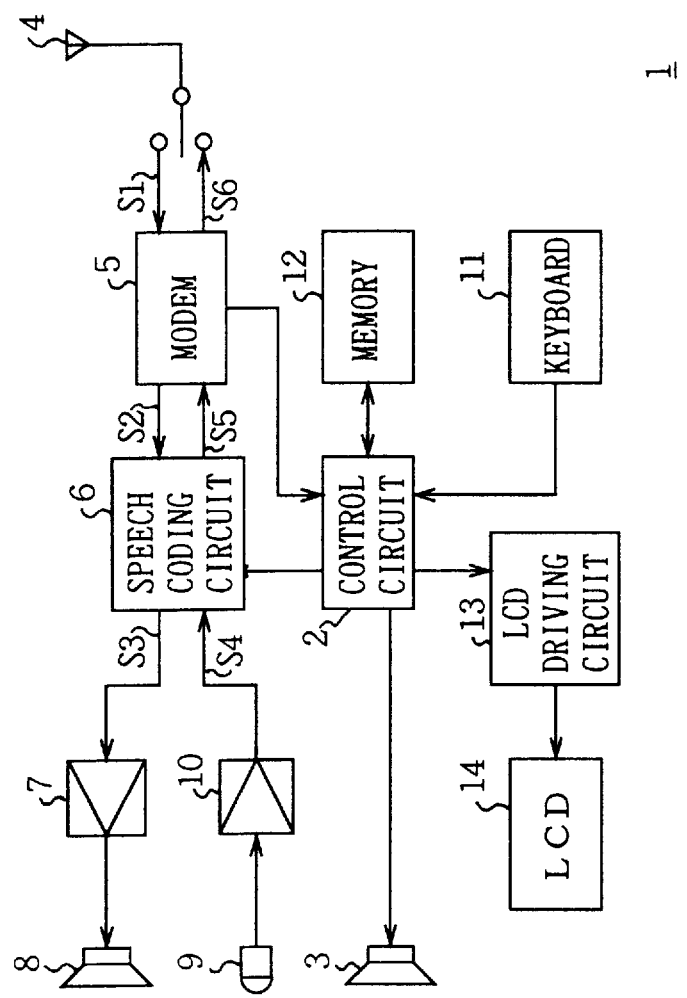
FIG. 1 is a block diagram showing the configuration of a portable telephone.

FIG. 1 shows the internal configuration of a portable telephone 1. An internal circuit is configured centering on a microcomputer-based control circuit 2. The control circuit 2 controls other internal circuit components.

First, when the portable telephone 1 is in the receiving state, an antenna 4 receives radio waves and supplies the received radio waves to a modem 5 as a high frequency signal S1. The control circuit 2 generates a call alarm from a speaker 3 based on the high frequency signal S1. The modem 5 demodulates the high frequency signal S1 to a low frequency signal S2 which is supplied to a speech coding circuit 6. The speech coding circuit 6 decodes the low frequency signal S2 to an audio signal S3 which is supplied to an amplifier 7. The amplifier 7 amplifies the audio signal S3 so as to allow the user to hear the amplified audio signal S3 through a speaker 8.

Next, when the portable telephone 1 is in a transmitting state, an amplifier 10 amplifies a speech of the user captured through a microphone 9 and supplies the amplified speech to the speech coding circuit 6 as an audio signal S4. The speech coding circuit 6 encodes the audio signal S4 to a low frequency signal S5 which is supplied to the modem 5. The modem 5 modulates the low frequency signal S5 to a high frequency signal S6 which is supplied to the antenna 4. The antenna 4 transmits the high frequency signal S6 to the outside as radio waves.

When the user continuously depresses the power key on the keyboard 11 for powering on the portable telephone 1, the control circuit 2 retrieves animation data stored in a memory 12. Then, the control circuit 2 drives an LCD (Liquid Crystal Display) driving circuit 13 to display an animation image or images in accordance with the duration of the power key being depressed by the user on a liquid crystal panel (thereinafter, referred to as LCD) 14. In this event, only when the user continuously depresses the power key for one second or more, after depressing the power key, the LCD 14 is driven to display a state in which the user is allowed to input a telephone number (through blinking of a cursor).

Conversely, when the user continuously depresses the power key on the keyboard 11 for powering off the portable telephone 1, the control circuit 2 retrieves animation data stored in the memory 12. Then, the control circuit 2 drives the LCD driving circuit 13 to display the animation image or images in accordance with a duration of the power key depressed by the user on the LCD 14 in the reverse order from the end to the start. In this event, only when the user continuously depresses the power key for one second or more, after depressing the power key, the display on the LCD 14 is erased and the portable telephone 1 is powered off.

FIGS. 2A to 2E show, by way of example, images displayed on the LCD 14 of the portable telephone 1.

Specifically, FIGS. 2A to 2E show that a chicken is hatching from an egg. FIG. 2A shows the contents of an image on the screen displayed when the user is continuously depressing the power key for the first 0 to 0.2 seconds. The displayed animation includes an image of an egg which is an initial image. With this image, no special effect sound is accompanied.

FIG. 2B shows the contents of an image on the screen displayed when the user is further continuously depressing the power key for 0.2 to 0.4 seconds. The displayed animation includes an image of a cracked egg. With this image, an effect sound "paritz" is generated from the speaker 3 serving as a confirmation means.

FIG. 2C shows the contents of an image on the screen displayed when the user is further continuously depressing the power key for 0.4 to 0.6 seconds. The displayed animation includes an image of a chicken hatching from the egg. With this image, an effect sound "peep" is generated from the speaker 3.

FIG. 2D shows the contents of an image on the screen displayed when the user is further continuously depressing the power key for 0.6 to 0.8 seconds. The displayed animation includes an image of a chicken which has completely hatched out. With this image, an effect sound "peep peep" is generated from the speaker 3.

FIG. 2E shows the contents of an image on the screen displayed when the user is further continuously depressing the power key for 0.8 to 1.0 seconds. The displayed animation includes an image of a hatched chicken which is going away. With this image, an effect sound "peep peep peep . . . " is generated from the speaker 3.

Then, if the user is still depressing the power key for one second or more, the display on the screen represents a radio wave receiving state of the portable telephone (through blinking of the cursor), in which the user is allowed to input a telephone number.

Similarly, when the user is to power off the portable telephone 1 after a call, the images are displayed on the screen of the LCD 14 on the reverse order from the image shown in FIG. 2E to that in FIG. 2A, and finally the portable telephone 1 is powered off.

(2) Procedure of Operations for Power-on

Figure 3:
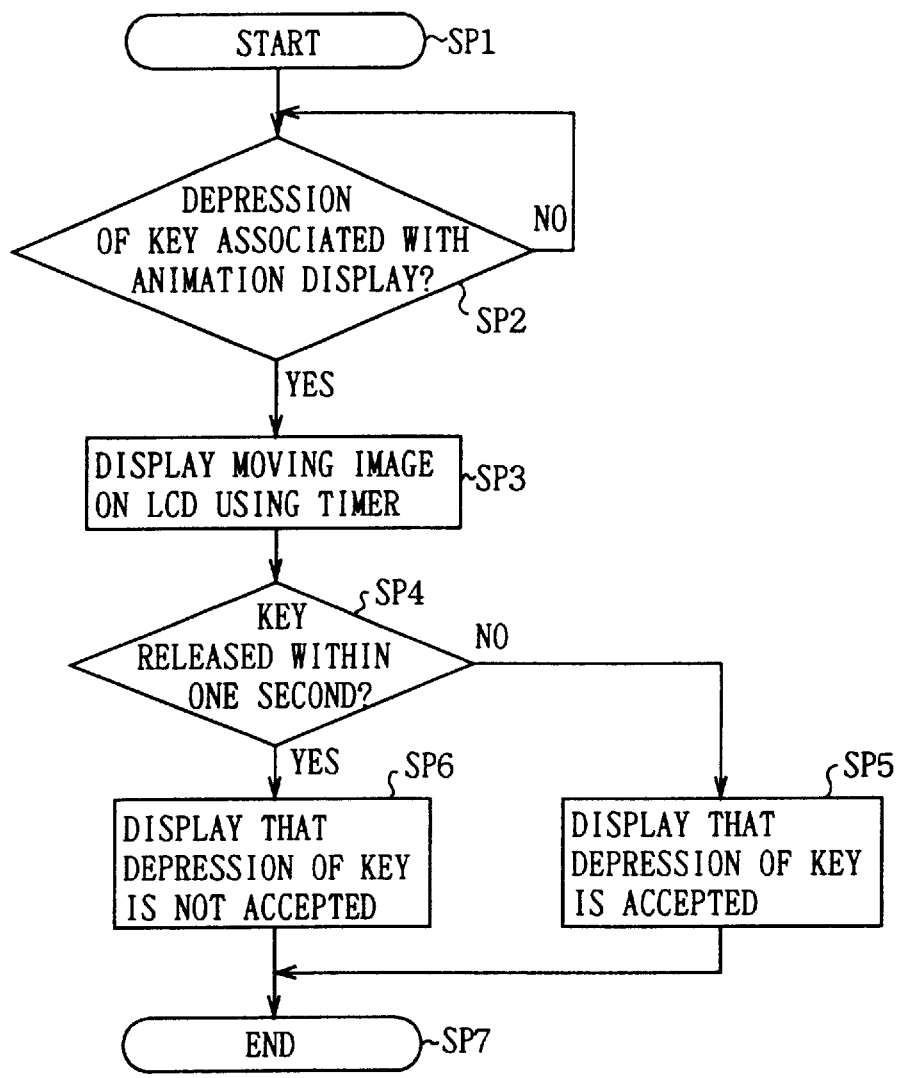
FIG. 3 is a flow chart showing the sequence of operations associated with the depression of a power key.

In the aforesaid configuration, a procedure of operations for powering on the portable telephone 1 will be described with reference to a flow chart shown in FIG. 3.

First, a sequence of power-on operations is started at step SP1. At step SP2, it is determined whether or not the user has depressed the power key which is associated with the display of the animation. If a negative answer is returned (i.e., the user has not depressed the power key), the procedure returns to step SP2. Conversely, if an affirmative answer is returned, the procedure proceeds to step SP3.

At step SP3, the animation is displayed on the LCD 14 sequentially from the image shown in FIG. 2A to the image shown in FIG. 2E in accordance with a duration of the power key depressed by the user. Then, it is determined at step SP4 whether or not the user has released the power key within one second.

If a negative answer is returned at step SP4 (i.e., the power key has been depressed for one second or more), the procedure proceeds to step SP5, where the portable telephone 1 displays a telephone number input state (through blinking of the cursor) on the LCD 14 to show the user that the depression of the power key is accepted. Then, at step SP7, the procedure of operations for powering on the portable telephone 1 is terminated.

Conversely, if an affirmative answer is returned at step SP4 (i.e., the user has released the power key in less than one second after he depressed it), the procedure proceeds to step SP6, where the portable telephone 1 displays the animation in the reverse order from an image displayed when the user released the power key to the initial image (to return to the image shown in FIG. 2A) on the LCD 14 to show the user that the portable telephone 1 is not powered on. Then, at step SP7, the procedure of operations for powering on the portable telephone 1 is terminated. At this time, the portable telephone 1 is of course in a power-off state.

As described above, the user can confirm that he has not depressed the power key for a sufficient duration to power on the portable telephone by viewing the animation displayed in the reverse order on the LCD 14.

(3) Procedure of Operations for Power-off

A procedure of operations for powering off the portable telephone 1 will be next described with reference to the flow chart shown in FIG. 3, similarly to the forgoing description on the procedure of operations for power-on. First, the procedure of operations for power-off starts at step SP1. Then, at step SP2, it is determined whether or not the user has depressed the power key which is associated with the display of the animation. If a negative answer is returned (i.e., the user has not depressed the power key), the procedure returns to step SP2. Conversely, if an affirmative answer is returned, the procedure proceeds to step SP3.

At step SP3, the animation is displayed on the LCD 14 sequentially changing from the image shown in FIG. 2A to the image shown in FIG. 2E in accordance with a duration of the power key depressed by the user. Then, it is determined at step SP4 whether or not the user has released the power key within one second.

If a negative answer is returned at step SP4 (i.e., the power key has been depressed for one second or more), the procedure proceeds to step SP5, where the animation is displayed on the LCD 14 changing from the image shown in FIG. 2E to the image shown in FIG. 2A, the initial image (FIG. 2A) is finally displayed, and subsequently the portable telephone 1 is powered off to show the user that the depression of the power key is accepted.

Conversely, if an affirmative answer is returned at step SP4 (i.e., the user has released the power key in less than one second after he depressed it), the procedure proceeds to step SP6, where the portable telephone 1 displays the animation in the reverse order from an image displayed when the user released the power key (to return to the image shown in FIG. 2E) on the LCD 14 to show the user that the depression of the power key is not accepted. Subsequently, the portable telephone 1 again displays a telephone number input state on the LCD 14. Then, at step SP7, the procedure of operations for powering off the portable telephone 1 is terminated.

As described above, the user can confirm that he has not depressed the power key for a sufficient duration to power off the portable telephone 1 by viewing the animation displayed in the reverse order on the LCD 14.

(4) Effects of Embodiment

According to the configuration as described above, since the user can confirm a state of the portable telephone 1 while continuously depressing the power key by viewing a display on the LCD 14 and by hearing sound effects from the speaker 3, the user will not continuously depress the power key more than necessary, thus making it possible to reduce damages to the power key.

While in the aforesaid embodiment, an animation representing that a chicken is hatching from an egg is used as the animation to be displayed on the LCD 14, the present invention is not limited thereto and any of various animations as long as it enables the user to readily recognize his manipulation can be employed.

Further, while in the aforesaid embodiment, sounds such as "paritz", "peep peep", and so on are generated as sound effects, the present invention is not limited thereto and a variety of sound effects including a combination of simple vibration sound, and so on can be employed.

Further, where in the aforesaid embodiment, a period of time for accepting the depression of the power key is set to one second, the present invention is not limited thereto and any period of time can be set for accepting the depression of the power key.

Furthermore, while in the aforesaid embodiment, the portable telephone is powered on and off using the depression of the power key, the present invention is not limited thereto and any numerical key or the like other than the power key can be used to power on/off the portable telephone, or a rotarytype jog dial can be used for the same purpose.

Furthermore, while in the aforesaid embodiment, a portable telephone 1 is applied as an apparatus in which an animation is displayed on LCD 14 in accordance with a duration of the power key depressed by the user, the present invention is not limited thereto and card type pocket bells, portable information processing terminals, electronic calculators, and so on can be applied.

According to the present invention as described above, when a manipulation key is continuously depressed for a predetermined duration or more, a communications terminal apparatus is set into an operating state corresponding to the manipulation key, after images sequentially changing in accordance with the lapse of a depressing time of the manipulation key are displayed on display means and effect sound changing in accordance with the images is generated, whereas, when the manipulation key is not continuously depressed for the predetermined duration or more, the communications terminal apparatus is returned to an operating state prior to the depression of the manipulation key, after the images having changed in accordance with a depressing time of the manipulation key are displayed on the display means on the reverse order and the effect sound having changed in accordance with the images is generated from the confirmation means together with the images. In this way, the user is made aware of an operating state of the communications terminal apparatus, thereby making it possible to realize a communications terminal apparatus and a display method thereof which make the user aware of a manipulated state of the manipulation key and can prevent damages to the manipulation key and malfunctions of the communications terminal apparatus caused by inadvertent manipulations of the user.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A communications terminal apparatus, comprising:
    a plurality of manipulation keys including a power on/off key; and
    audio-visual signal generating means for generating a sequence of audio-visual signals that change in accordance with a lapse of time of said power on/off key being continuously activated;
    said audio-visual signal generating means including:
        storage means for storing said sequence of audio-visual signals;
        audio-visual means for displaying to a user of said communications terminal said sequence of audio-visual signals read from said storage means; and
        control means for controlling said audio-visual display means to display to said user said sequence of audio-visual signals changing in accordance with said lapse of time and for turning on said communications terminal after a predetermined period of time of continuous activation of said power on/off key, and said control means turns off said communications terminal after displaying to said user a reverse order sequence of said sequence of audio-visual signals when said power on/off key is activated but not continuously activated for said predetermined period of time.

2. The communications terminal apparatus according to claim 1, wherein said plurality of manipulation keys is comprised of push-button type keys.

3. The communications terminal apparatus according to claim 1, wherein said plurality of manipulation keys is comprised of rotary-type keys.

4. A communications terminal apparatus comprising:
    a plurality of manipulation keys including a power on/off key;
    storage means for storing a sequence of images which sequentially change in accordance with a lapse of time of said power on/off key being continuously activated and for storing sound effects corresponding to said sequence of images;
    display means for displaying said sequence of images read from said storage means;
    sound effect means for generating sound effects corresponding to said sequence of images read from said storage means; and control means for turning on said communications terminal after sequentially displaying said sequence of images on said display means and sequentially generating said corresponding sound effects using said sound effect means and after said power on/off key is continuously activated for a predetermined period of time, and for turning off said communications terminal after displaying a reverse sequence of said sequence of images and generating said corresponding sound effects to said reverse order sequence of said sequence of images using said sound effect means when said power on/off key is not continuously activated for said predetermined period of time.

5. The communications terminal apparatus according to claim 4, wherein said sequence of images are moving images.

6. The communications terminal apparatus according to claim 4, wherein said plurality of manipulation keys is comprised of push-button type keys.

7. The communications terminal apparatus according to claim 4, wherein said plurality of manipulation keys is comprised of rotary-type keys.

8. A display method for use in a communications terminal apparatus, comprising the steps of:

generating a sequence of audio-visual signals that change in accordance with a lapse of time of a continuous manipulation of a power on/off key and displaying said audio-visual signals on a display;

turning on said communications terminal after a predetermined period of time of continuous manipulation of said power on/off key and after sequentially displaying said sequence of audio-visual signals; and turning off said communications terminal after displaying a reverse order of said sequence of audio-visual signals when said power on/off key is activated but not continuously manipulated for said predetermined period of time.

9. A display method for use in a communications terminal apparatus, comprising the steps of:

generating a sequence of images in accordance with a lapse of time from a continuous activation of a manipulation key and displaying said sequence of images on a display;

setting said communications terminal to an operation state corresponding to said manipulation key after sequentially displaying said sequence of images and sequentially generating sound effects corresponding to said sequence of images when said manipulation key is continuously activated for a predetermined period of time; and returning said communications terminal apparatus to a previous operation state to the operation of said manipulation key after displaying a reverse order sequence of said sequence of images on said display and generating said corresponding sound effects to said reverse order sequence of said sequence of images when said manipulation key is activated but not continuously activated for said predetermined duration.

10. The method as claimed in claim 9, wherein the operating function of said manipulation key is to power on and off the communication terminal apparatus.

* * * * *